United States Patent
Zheng et al.

(10) Patent No.: US 11,570,670 B2
(45) Date of Patent: Jan. 31, 2023

(54) MEASUREMENT REPORT TRIGGERING METHOD AND APPARATUS

(71) Applicant: HUAWEI TECHNOLOGIES CO., LTD., Guangdong (CN)

(72) Inventors: Lili Zheng, Shanghai (CN); Hongping Zhang, Shanghai (CN); Qinghai Zeng, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 64 days.

(21) Appl. No.: 17/127,388

(22) Filed: Dec. 18, 2020

(65) Prior Publication Data

US 2021/0105679 A1 Apr. 8, 2021

Related U.S. Application Data

(63) Continuation of application No. PCT/CN2019/092304, filed on Jun. 21, 2019.

(30) Foreign Application Priority Data

Jun. 21, 2018 (CN) .......................... 201810646361.1

(51) Int. Cl.
*H04W 36/00* (2009.01)
*H04W 36/08* (2009.01)
(Continued)

(52) U.S. Cl.
CPC ....... *H04W 36/0085* (2018.08); *H04W 24/10* (2013.01); *H04W 36/0072* (2013.01);
(Continued)

(58) Field of Classification Search
CPC ............. H04W 36/36; H04W 36/0058; H04W 36/0072; H04W 36/0085; H04W 36/08;
(Continued)

(56) References Cited

U.S. PATENT DOCUMENTS

| | | | |
|---|---|---|---|
| 2011/0039557 A1* | 2/2011 | Narasimha | H04W 24/10 455/434 |
| 2017/0214444 A1 | 7/2017 | Nigam et al. | |
| 2018/0124661 A1 | 5/2018 | Tsai | |

FOREIGN PATENT DOCUMENTS

| | | |
|---|---|---|
| CN | 102300246 A | 12/2011 |
| CN | 104869589 A | 8/2015 |

(Continued)

OTHER PUBLICATIONS

Huawei, HiSilicon, Cell quality adjustment for connected UE. 3GPP TSG-RAN WG2#101, Athens, Greece, Feb. 26-Mar. 2, 2018, R2-1803255, 4 pages.

(Continued)

*Primary Examiner* — Nam T Huynh
(74) *Attorney, Agent, or Firm* — Womble Bond Dickinson (US) LLP

(57) ABSTRACT

Embodiments of the application provide a communications method and apparatus. A target cell is determined based on measurement results of N measured cells and a preset value when there is a first cell satisfying a report trigger condition. A measurement result of the target cell is sent to a base station. A terminal may not only send the measurement result of the cell satisfying the trigger condition to the base station, but also send a measurement result of another cell to the base station. In this way, a quantity of cells that can be selected during determining of handover can be increased, to help the base station select a suitable cell for the terminal.

17 Claims, 4 Drawing Sheets

(51) Int. Cl.
    *H04W 72/04*     (2009.01)
    *H04W 36/30*     (2009.01)
    *H04W 24/10*     (2009.01)
    *H04W 36/36*     (2009.01)

(52) U.S. Cl.
    CPC .......... *H04W 36/08* (2013.01); *H04W 36/30* (2013.01); *H04W 36/36* (2013.01); *H04W 72/046* (2013.01)

(58) Field of Classification Search
    CPC ..... H04W 36/30; H04W 24/10; H04W 36/00; H04W 36/0088
    See application file for complete search history.

(56) References Cited

FOREIGN PATENT DOCUMENTS

| | | |
|---|---|---|
| CN | 105072643 A | 11/2015 |
| CN | 106257954 A | 12/2016 |
| CN | 107333293 A | 11/2017 |
| CN | 107426765 A | 12/2017 |
| CN | 107592645 A | 1/2018 |
| CN | 107820717 A | 3/2018 |
| CN | 107889145 A | 4/2018 |
| WO | 2014035304 A1 | 3/2014 |
| WO | 2017084005 A1 | 5/2017 |
| WO | 2017111671 A1 | 6/2017 |
| WO | 2018084968 A1 | 5/2018 |
| WO | 2018099548 A1 | 6/2018 |

OTHER PUBLICATIONS

3GPP TS 38.300 V15.2 0 (Jun. 2018);3rd Generation Partnership Project Technical Specification Group Radio Access Network;NR; NR and NG-RAN Overall Description;Stage 2(Release 15);total 87 pages.

MediaTek Inc., Measurement Events and Reporting for NR Mobility. 3GPP TSG-RAN WG2 Meeting #97, Athens, Greece, Feb. 13-17, 2017, R2-1701330, 3 pages.

MediaTek Inc., Beam-based Measurement Reporting for NR. 3GPP TSG-RAN WG2 Meeting #97bis, Spokane, WA, USA, Apr. 3-7, 2017, R2-1703011, 3 pages.

\* cited by examiner

MEASUREMENT REPORT TRIGGERING METHOD AND APPARATUS

CROSS-REFERENCE TO RELATED APPLICATIONS

This application is a continuation of International Application No. PCT/CN2019/092304, filed on Jun. 21, 2019, which claims priority to Chinese Patent Application No. 201810646361.1, filed on Jun. 21, 2018. The disclosures of the aforementioned applications are hereby incorporated by reference in their entireties.

TECHNICAL FIELD

This application relates to the field of communications technologies, and more specifically, to a communications method and apparatus.

BACKGROUND

In some cases, a cell (which is referred to as a "serving cell" for short below) providing a service for a terminal needs to be changed from one cell to another cell. Specifically, a base station sends a measurement configuration to the terminal. The terminal may measure the cell according to the measurement configuration, and determine, based on a trigger condition, whether to report a measurement result. When a measurement result of a cell satisfies the trigger condition, the terminal may send the measurement result of the cell to the base station. The base station makes a decision based on the measurement result reported by the terminal, to determine whether to change the serving cell of the terminal from one cell to another cell.

However, in some cases, a cell that first triggers reporting of a measurement result may not be a suitable cell. Therefore, a cell that is selected by the base station and to which the terminal needs to be handed over may not be a suitable cell. Therefore, the current technical solution may cause a problem that the terminal cannot be handed over to a suitable cell in a handover process.

SUMMARY

The application provides a communications method and apparatus, to help a terminal select a target cell to which the terminal is to be handed over.

In at least one embodiment, the application provides a communication method. The method includes: determining a target cell based on measurement results of N measured cells and a preset value when there is a first cell satisfying a report trigger condition, where N is a positive integer greater than or equal to 1; and sending a measurement result of the target cell to a base station. Based on the foregoing technical solution, the terminal may not only send the measurement result of the cell satisfying the trigger condition to the base station, but also send a measurement result of another cell to the base station. In this way, a quantity of cells that can be selected during determining of handover can be increased, to help the base station select a suitable cell for the terminal.

In at least one embodiment, the method further includes: receiving a measurement configuration from the base station, where the measurement configuration includes the preset value.

In at least one embodiment, the preset value is a first preset value, and the determining a target cell based on measurement results of N measured cells and a preset value includes: determining a cell in the N cells as the target cell, where an absolute value of a difference between cell quality of the cell and cell quality of a second cell is less than the first preset value, and the second cell is a cell with best cell quality in the N cells. Based on the foregoing technical solution, measurement results sent to the base station may include a measurement result of the cell with the best cell quality and a measurement result of a cell with relatively good cell quality. This helps the base station select a suitable cell for the terminal.

In at least one embodiment, the preset value is a second preset value, and the determining a target cell based on measurement results of N measured cells and a preset value includes: determining a quantity of good beams in each of the N cells, where the good beam is a beam whose beam quality is greater than a good-beam threshold; determining a largest value of the quantities of good beams in the N cells; and determining a cell in the N cells as the target cell, where an absolute value of a difference between a quantity of good beams in the cell and the largest value of the quantities of good beams is less than the second preset value. Based on the foregoing technical solution, measurement results sent to the base station may include a measurement result of a cell with a largest quantity of good beams and a measurement result of a cell with a relatively large quantity of good beams. This helps the base station select a suitable cell for the terminal.

In at least one embodiment, the preset value is a third preset value, and the determining a target cell based on measurement results of N measured cells and a preset value includes: determining adjusted cell quality of each of the N cells based on a measurement event; and determining a cell in the N cells as the target cell, where an absolute value of a difference between adjusted cell quality of the cell and a trigger threshold is less than the third preset value. Based on the foregoing technical solution, measurement results sent to the base station may include a measurement result of a cell with best cell quality and a measurement result of a cell with relatively good cell quality. This helps the base station select a suitable cell for the terminal.

In at least one embodiment, the preset value is a target cell quality threshold, and the determining a target cell based on measurement results of N measured cells and a preset value includes: determining adjusted cell quality of each of the N cells based on a measurement event; and determining a cell whose adjusted cell quality is greater than the preset target cell threshold as the target cell. Based on the foregoing technical solution, measurement results sent to the base station may include a measurement result of a cell with best cell quality and a measurement result of a cell with relatively good cell quality. This helps the base station select a suitable cell for the terminal.

In at least one embodiment, the preset value includes a value $M_1$, and the determining a target cell based on measurement results of N measured cells and a preset value includes: determining $M_2$ of the N cells as the target cells, where cell quality of any one of the target cells is greater than or equal to cell quality of any non-target cell, and the non-target cell is a cell not belonging to the target cells in the N cells, where $M_1$ is a positive integer greater than or equal to 1, $M_2$ is a positive integer greater than or equal to 1, and $M_2$ is less than or equal to both N and $M_1$. Based on the foregoing technical solution, measurement results sent to the base station may include a measurement result of a cell with best cell quality and a measurement result of a cell with relatively good cell quality. This helps the base station select a suitable cell for the terminal.

In at least one embodiment, the application provides a communication method. The method includes: receiving a measurement result of a target cell that is sent by a terminal, where the target cell is determined by the terminal based on measurement results of N measured cells and a preset value after the terminal determines that there is a first cell satisfying a report trigger condition, where N is a positive integer greater than or equal to 1; and determining, based on the measurement result of the target cell, whether to change a serving cell of the terminal. Based on the foregoing technical solution, the base station may obtain measurement results of more cells, to help the base station select a suitable cell to which the terminal is to be handed over.

In at least one embodiment, the method further includes: sending a measurement configuration to the terminal, where the measurement configuration includes the preset value.

In at least one embodiment, the preset value includes at least one of a first preset value, a second preset value, a third preset value, a preset target cell threshold, and a value $M_1$, where $M_1$ is a positive integer greater than or equal to 1. Based on the foregoing, the base station may indicate the terminal to feed back different types of measurement results of cells.

In at least one embodiment, the application provides a communication method. The method includes: determining N similar cells, where the N similar cells include a third cell and a cell, where an absolute value of a difference between cell quality of the cell and cell quality of the third cell is less than a cell quality preset value; and determining, when a serving cell of a terminal is one of the similar cells and a quantity of good beams in the serving cell satisfies a preset condition, to camp on the serving cell.

In at least one embodiment, the determining, when a quantity of good beams in the serving cell of the terminal satisfies a preset condition, to camp on the serving cell includes: determining, when it is determined that the quantity of good beams in the serving cell is greater than a beam quantity preset value, to camp on the serving cell.

In at least one embodiment, the determining, when a quantity of good beams in the serving cell of the terminal satisfies a preset condition, to camp on the serving cell includes: determining, when it is determined that the quantity of good beams in the serving cell is greater than or equal to a quantity of good beams in any one of the N similar cells, to camp on the serving cell.

In at least one embodiment, before the determining N similar cells, the method further includes: determining that the quantity of good beams in the serving cell is less than a measurement start threshold.

In at least one embodiment, before the determining N similar cells, the method further includes: determining that the quantity of good beams in the serving cell is less than or equal to a measurement start threshold.

In at least one embodiment, the application provides a communication method. The method includes: determining whether a quantity of good beams in a serving cell of a terminal satisfies a preset condition; and determining, if the quantity of good beams in the serving cell satisfies the preset condition, to start measurement of an intra-frequency cell of the serving cell, measurement of a cell at a frequency whose priority is the same as or lower than a priority of a frequency of the serving cell, and measurement of a cell in a system whose priority is the same as or lower than the priority of the frequency of the serving cell. In the foregoing technical solution, a measurement process may be started when a quantity of good beams in a serving cell does not satisfy a preset threshold, to find a cell with better cell quality as a serving cell of a terminal.

In at least one embodiment, the determining whether a quantity of good beams in a serving cell of a terminal satisfies a preset condition includes: determining, when it is determined that the quantity of good beams in the serving cell is less than the preset threshold, that the quantity of good beams in the serving cell satisfies the preset condition.

In at least one embodiment, the determining whether a quantity of good beams in a serving cell of a terminal satisfies a preset condition includes: determining, when it is determined that the quantity of good beams in the serving cell is less than or equal to the preset threshold, that the quantity of good beams in the serving cell satisfies the preset condition.

In at least one embodiment, the application provides a communications apparatus. The apparatus includes a module configured to perform the methods according to embodiments as described herein.

In at least one embodiment, the communications apparatus is a terminal, or a component (e.g., a chip or a circuit) that can be used in a terminal.

In at least one embodiment, the communications apparatus is a base station, or a component (e.g., a chip or a circuit) that can be used in a base station.

In at least one embodiment, the application provides a storage medium. The storage medium stores instructions used to perform the methods according to embodiments as described herein.

In at least one embodiment, the application provides a computer program product including an instruction, and when the computer program product is executed on a computer, the computer is enabled to perform the methods according to embodiments as described herein.

DESCRIPTION OF EMBODIMENTS

Figure 1:
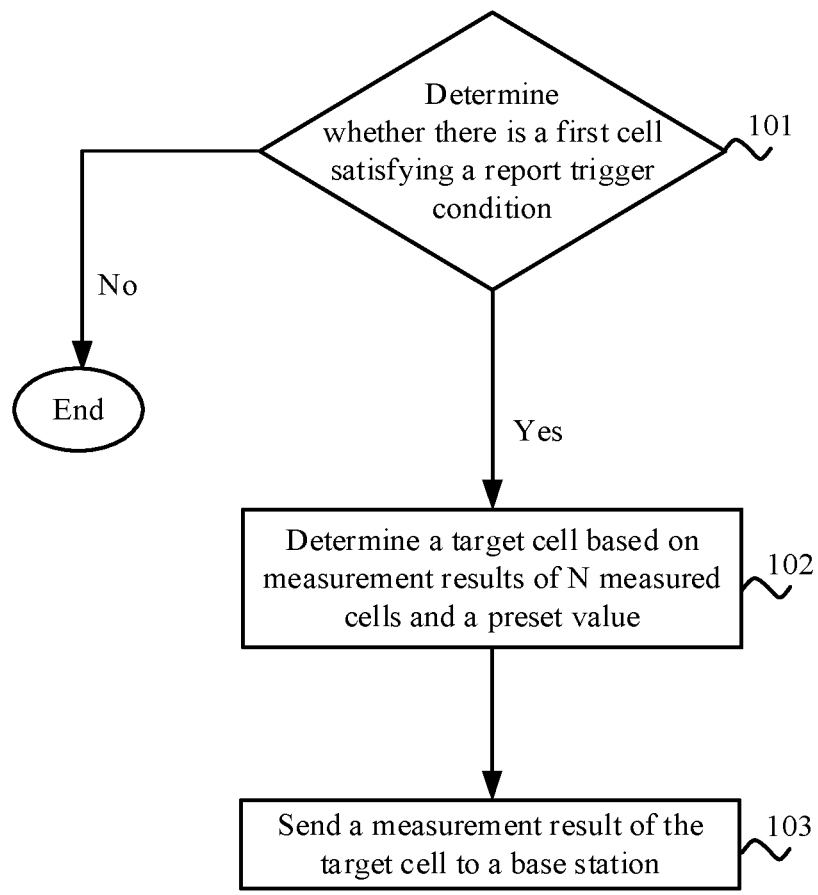
FIG. 1 is a schematic flowchart of a communication method according to an embodiment of the application.

The following describes the technical solutions of the application with reference to the accompanying drawings.

The technical solutions in embodiments of the application may be applied to a long term evolution (LTE) system, an LTE frequency division duplex (FDD) system, an LTE time division duplex (TDD) system, a 5th generation (5G) system or a new radio (NR) system, or the like.

A terminal in embodiments of the application may be user equipment, an access terminal, a subscriber unit, a subscriber station, a mobile station, a remote station, a remote terminal, a mobile device, a user terminal, a terminal device, a wireless communications device, a user agent, or a user apparatus. Alternatively, the terminal may be a cellular phone, a cordless telephone set, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal in a future 5G network, a terminal in a future evolved public land mobile network (PLMN), or the like. This is not limited in embodiments of the application.

A network device in embodiments of the application may be a device configured to communicate with the terminal. The network device may be a base transceiver station (BTS) in a global system for mobile communications (GSM) system or a code division multiple access (CDMA) system, or may be a NodeB (NB) in a wideband code division multiple address (WCDMA) system, or may be an evolved NodeB (eNB or eNodeB) in an LTE system, or may be a radio controller in a scenario of a cloud radio access network (CRAN). Alternatively, the network device may be a relay node, an access point, a vehicle-mounted device, a wearable device, a network device in the 5G network, a network device in the future evolved PLMN, or the like. This is not limited in embodiments of the application.

In embodiments of the application, the terminal or the network device includes a hardware layer, an operating system layer running above the hardware layer, and an application layer running above the operating system layer. The hardware layer includes hardware such as a central processing unit (CPU), a memory management unit (MMU), and a memory (also referred to as a main memory). The operating system may be any one or more computer operating systems that implement service processing through a process, for example, a Linux operating system, a Unix operating system, an Android operating system, an iOS operating system, or a Windows operating system. The application layer includes applications such as a browser, an address book, word processing software, and instant communications software. In addition, a structure of an execution body of a method provided in embodiments of the application is not specifically limited in embodiments of the application, provided that a program that records code of the method provided in embodiments of the application can be run to perform communication based on the method provided in embodiments of the application. For example, the execution body of the method provided in embodiments of the application may be the terminal or the network device, or may be a function module that can invoke and execute the program in the terminal or the network device.

In addition, aspects or features of the application may be implemented as a method, an apparatus, or a product that uses standard programming and/or engineering technologies. The term "product" used in the application covers a computer program that can be accessed from any computer-readable component, carrier or medium. For example, a computer-readable medium may include, but is not limited to: a magnetic storage component (for example, a hard disk, a floppy disk or, or a magnetic tape), an optical disc (for example, a compact disc (CD) or a digital versatile disc (DVD)), a smart card, and a flash memory component (for example, an erasable programmable read-only memory (EPROM), a card, a stick, or a key drive). In addition, various storage media described in the specification may represent one or more devices and/or other machine-readable media that are configured to store information. The term "machine-readable media" may include, but is not limited to a radio channel, and various other media that can store, contain, and/or carry an instruction and/or data. To help One of ordinary skill in the art better understand the technical solutions of the application, some concepts related in embodiments of the application are first described.

In embodiments of the application, a beam may be understood as a spatial resource, and may be a transmit or receive precoding vector having energy transmission directivity. The transmit or receive precoding vector can be identified by using index information. The index information may correspond to a resource identity (ID) configured for the terminal. For example, the index information may correspond to an identity or a resource of a configured channel state information reference signal (CSI-RS), or may correspond to an identity or a resource of a configured uplink sounding reference signal (SRS). Optionally, the index information may alternatively be an index information explicitly or implicitly carried by a signal or channel carried by a beam. The energy transmission directivity may mean that precoding processing is performed, by using the precoding vector, on a signal that needs to be sent, and the signal obtained through the precoding processing has specific spatial directivity. The signal obtained through the precoding processing by using the precoding vector is received at a relatively good receive power, and for example, a receiving demodulation signal-to-noise ratio is satisfied. Alternatively, the energy transmission directivity may mean that same signals sent from different spatial locations are received by using the precoding vector at different receive powers. Optionally, a same communications apparatus (for example, a terminal or a network device) may have different precoding vectors, and different devices may also have different precoding vectors, that is, correspond to different beams. For a configuration or capability of a communications apparatus, one communications apparatus may use one or more of a plurality of different precoding vectors at the same time. In other words, one or more beams may be simultaneously formed.

FIG. 1 is a schematic flowchart of a communication method according to an embodiment of the application. When the method shown in FIG. 1 is described, some operations are described by using a terminal as an execution body. However, this is only for ease of description of the method shown in FIG. 1. The method shown in FIG. 1 may be implemented by a terminal, or may be implemented by a component (e.g., a chip or a circuit) that can be used in a terminal.

101. Determine whether there is a first cell satisfying a report trigger condition.

If there is the first cell, operation 102 is performed. If there is no first cell, the process ends.

It may be understood that, there may be a plurality of cells satisfying the report trigger condition.

In some embodiments, once it is determined that there is a cell satisfying the report trigger condition, operation 102 may be performed. For example, assuming that a measurement event is A4 and the terminal has six neighboring cells, whether neighboring cells 1 to 6 satisfy the report trigger condition is sequentially determined. In other words, whether the neighboring cell 1 satisfies the report trigger condition is first determined, and whether the neighboring cell 2 satisfies the report trigger condition is then determined. The rest can be deduced by analogy. If it is determined that the neighboring cell 1 and the neighboring cell 2 do not satisfy the report trigger condition and the neighboring cell 3 satisfies the report trigger condition, operation 102 may be performed without continuing to determine whether the neighboring cells 4 to 6 satisfy the report trigger condition. Optionally, in some other embodiments, operation 102 may be performed after whether the cells satisfy the report trigger condition is completely determined and it is determined that there is a cell satisfying the report trigger condition.

For a process of determining whether there is a cell satisfying the trigger condition, refer to a stipulation in an existing protocol. Only a brief description is provided below. The terminal may determine, by using the following operations, whether there is the first cell.

Operation 1. Determine cell quality.

Optionally, in some embodiments, the cell quality may be represented by using an average value of beam quality of K beams in the cell. The beam quality of the K beams is all greater than a preset beam threshold. K is a positive integer greater than or equal to 1. If a quantity of beams whose beam quality is greater than the preset beam threshold in a cell is greater than K, K beams may be selected from the beams whose quantity is greater than K, and an average value of the K beams is used as cell quality of the cell. The selected K beams may be K beams with highest beam quality, or may be K beams whose beam quality is lowest but is greater than the preset beam threshold, or may be K randomly selected beams. Alternatively, the K beams are selected by using another method. This is not limited in an embodiment of the application. If a quantity of beams whose beam quality is greater than the preset beam threshold in a cell is less than K, cell quality of the cell is an average value of all beam quality greater than the preset beam threshold in the cell. The average value of the beam quality may be one of an arithmetic average value, a geometric average value, a weighted average value, and the like. This is not limited in an embodiment of the application. The beam quality may be represented by a reference signal received power (RSRP) or reference signal received quality (RSRQ).

Optionally, in some other embodiments, during determining of cell quality of a cell, an average value of beam quality of K beams in the cell may be first determined, and layer 3 filtering is then performed on the average value of the beam quality of the K beams. A value obtained through the layer 3 filtering is the cell quality of the cell. The beam quality of the K beams is all greater than the preset beam threshold. Similarly, if a quantity of beams whose beam quality is greater than the preset beam threshold in a cell is greater than K, K beams may be selected from the beams whose quantity is greater than K, and an average value of the K beams is used as cell quality of the cell. The selected K beams may be K beams with highest beam quality, or may be K beams whose beam quality is lowest but is greater than the preset beam threshold, or may be K randomly selected beams. Alternatively, the K beams are selected by using another method. This is not limited in an embodiment of the application. If a quantity of beams whose beam quality is greater than the preset beam threshold in a cell is less than K, cell quality of the cell is an average value of all beam quality greater than the preset beam threshold in the cell. The average value of the beam quality may be one of an arithmetic average value, a geometric average value, a weighted average value, and the like. This is not limited in an embodiment of the application.

A value of K and the preset beam threshold that are used in operation 1 may be received from a base station.

Operation 2. Determine, based on the cell quality and a trigger threshold, whether there is a cell satisfying the trigger condition.

Optionally, in some embodiments, the cell quality may be directly compared with the trigger threshold. If cell quality of a cell is greater than the trigger threshold, the cell is a cell satisfying the trigger condition. The trigger threshold may be a trigger threshold indicated by the base station, or may be a trigger threshold determined by the terminal. For example, if cell quality of a cell is −59 dBm, and the trigger threshold is −61 dBm, the cell is a cell satisfying the preset condition.

Optionally, in some other embodiments, adjusted cell quality may be first determined, and whether a cell satisfies the trigger condition is then determined based on the adjusted cell quality. The adjusted cell quality may be determined based on a measurement event. The measurement event may be indicated by the base station.

For example, if the measurement event is A3, the adjusted cell quality may be determined according to the following formula:

$$Q = Mn + Ofn + Ocn - Hys \quad \text{(formula 1.1)}$$

Q represents adjusted cell quality of a cell, Mn represents cell quality of the cell, Ofn represents a frequency-level offset, Ocn represents a cell-level offset, and Hys is hysteresis.

The trigger threshold is determined according to the following formula:

$$T\_Thresh = Mp + Ofp + Ocp + Off \quad \text{(formula 1.2)}$$

T_Thresh represents the trigger threshold, and Mp represents cell quality, of a primary serving cell of a primary base station serving the terminal or a primary serving cell of a secondary base station serving the terminal, obtained without any offset. Ocp represents cell-level offset. Off represents an offset value.

If adjusted cell quality of a cell is greater than the trigger threshold, the cell is a cell satisfying the report trigger condition (e.g., the first cell). One of ordinary skill in the art may understand that, the adjusted cell quality, compared with the trigger threshold, in the measurement event A3 is adjusted cell quality of a neighboring cell.

For another example, if the measurement event is A4, the adjusted cell quality may be determined according to the formula 1.1. If adjusted cell quality of a cell is greater than the trigger threshold, the cell is a cell satisfying the report trigger condition (e.g., the first cell). The trigger threshold is indicated by the base station. In other words, the trigger threshold is received from the base station. One of ordinary skill in the art may understand that, the adjusted cell quality, compared with the trigger threshold, in the measurement event A4 is adjusted cell quality of a neighboring cell.

For another example, if the measurement event is A5, the adjusted cell quality may be determined according to the formula 1.1. Adjusted cell quality of a primary serving cell of a primary base station serving the terminal or a primary serving cell of a secondary base station serving the terminal is determined according to the following formula:

$$Q\_Mp = Mp + Hys \quad \text{(formula 1.3)}$$

Q_Mp represents the adjusted cell quality of the primary serving cell of the primary base station serving the terminal or the primary serving cell of the secondary base station serving the terminal, Mp represents cell quality, of the primary serving cell of the primary base station serving the terminal or the primary serving cell of the secondary base station serving the terminal, obtained with no offset, and Hys is hysteresis.

Further, if the measurement event is A5, the trigger threshold may include a first trigger threshold and a second trigger threshold, and the first trigger threshold and the second trigger threshold are indicated by the base station.

If the adjusted cell quality of the primary serving cell of the primary base station serving the terminal or the primary serving cell of the secondary base station serving the terminal is less than the first trigger threshold and adjusted cell quality of a cell is greater than the second trigger threshold, the cell is a cell satisfying the report trigger condition (e.g., the first cell). One of ordinary skill in the art may understand that, the adjusted cell quality, compared with the second trigger threshold, in the measurement event A5 is adjusted cell quality of a neighboring cell.

For another example, if the measurement event is A6, the adjusted cell quality may be determined according to the following formula:

$$Q = Mn + Ocn - Hys \quad \text{(formula 1.4)}$$

Q represents adjusted cell quality of a cell, Mn represents cell quality of the cell, Ocn represents a cell-level offset, and Hys is hysteresis.

The trigger threshold is determined according to the following formula:

$$T\_Thresh = Ms + Ocs + Off \quad \text{(formula 1.5)}$$

T_Thresh represents the trigger threshold, and Ms represents cell quality, of a serving cell of the terminal, obtained when no offset is considered. Ocs represents a cell-level offset of the serving cell. Off represents an offset value.

If adjusted cell quality of a cell is greater than the trigger threshold, the cell is a cell satisfying the report trigger condition (e.g., the first cell). One of ordinary skill in the art may understand that, the adjusted cell quality, compared with the trigger threshold, in the measurement event A6 is adjusted cell quality of a neighboring cell.

In the formulas 1.1 to 1.5, a value of any one or more parameters (for example, Ofn, Ocn, and Hys) other than Mn, Mp, and Ms may be 0.

Optionally, in some embodiments, cell quality (or adjusted cell quality) of all cells serving the terminal may be first determined, and the cell quality (or the adjusted cell quality) of all the cells is then separately compared with the trigger threshold, to determine whether there is a cell satisfying the trigger condition.

Optionally, in some other embodiments, after cell quality (or adjusted cell quality) of a cell is determined, the cell quality (or the adjusted cell quality) of the cell may be compared with the trigger threshold, to determine whether there is a cell satisfying the trigger condition.

In an embodiment shown in FIG. 1, the cells measured by the terminal belong to a same MO or different MOs. In a possible manner, the terminal each time reports measurement results of cells belonging to a same MO.

The base station configures an MO number for all cells in a same MO. MO numbers of cells belonging to different MOs are different. When indicating the terminal to measure a cell, the base station indicates an MO number to the terminal. The terminal may measure the corresponding cell based on the MO number. In some cases, the base station may indicate, at one time, the terminal to measure a cell in one MO. In other words, a measurement indication sent by the base station to the terminal carries only a number of one MO. In some other cases, the base station may alternatively indicate, at one time, the terminal to measure cells in two or more MOs. In other words, a measurement indication sent by the base station to the terminal may carry numbers of two or more MOs. In this case, when reporting measurement results, the terminal may separately report measurement results of cells belonging to different MOs to the base station. For example, the base station indicates the terminal to separately measure a cell in an MO A and a cell in an MO B. The terminal may send a measurement result of the cell in the MO A to the base station by using an uplink message, and send a measurement result of the cell in the MO B to the base station by using another uplink message. It can be learned that, when multi-MO measurement is performed, although the terminal receives numbers of a plurality of MOs, manners of measuring cells and reporting a measurement result of a cell is the same as those in single-MO measurement.

102. Determine a target cell based on measurement results of N measured cells and a preset value, where N is a positive integer greater than or equal to 1.

It may be understood that, in an embodiment of the application, the target cell may be determined by using measurement results of all or some of the N cells.

Optionally, in some embodiments, the preset value may be preset in the terminal. In other words, the terminal may directly use a stored preset value.

Optionally, in some other embodiments, the method may further include: receiving a measurement configuration sent by the base station, where the measurement configuration includes the preset value. In other words, before operation 102, the preset value sent by the base station may be further received.

Optionally, in some embodiments, the measurement configuration may carry all the preset value, the value of K, the preset beam threshold, and the trigger threshold. In this way, signaling overheads can be reduced. Optionally, in some other embodiments, a message may carry the preset value, and another message may carry the value of K, the preset beam threshold, and the trigger threshold. In this way, content that is specified in an existing protocol and carried in a message does not need to be changed.

Optionally, in some embodiments, the N cells include the serving cell of the terminal and the neighboring cell of the serving cell.

Optionally, in some other embodiments, the N cells include the neighboring cell of the serving cell of the terminal. In other words, the N cells may not include the serving cell of the terminal.

Optionally, in some embodiments, the preset value is a first preset value, and the determining a target cell based on measurement results of N measured cells and a preset value includes: determining a cell in the N cells as the target cell, where an absolute value of a difference between cell quality of the cell and cell quality of a second cell is less than the first preset value, and the second cell is a cell with best cell quality in the N cells.

For example, it is assumed that a value of N is 6. The six cells are a cell 1, a cell 2, a cell 3, a cell 4, a cell 5, and a cell 6. It is assumed that cell quality of the six cells is respectively −62 dBm, −63.5 dBm, −59 dBm, −64 dBm, −60 dBm, and −59.5 dBm. It can be learned that, the cell quality of the cell 3 has a largest value of the cell quality of the six cells. It is assumed that the first preset value is 2 dBm. A difference between the largest value of the cell quality and the first preset value is −61 dBm. In this case, the cell quality of the cell 3, the cell 5, and the cell 6 is all greater than −61 dBm. Therefore, the target cells include the cell 3, the cell 5, and the cell 6.

Optionally, in some embodiments, the target cell may be the second cell. In other words, in the N cells, aside from the cell whose cell quality has the largest value, there is no other cell, where an absolute value of a difference between cell quality of the cell and the cell quality of the second cell is less than the first preset value.

For example, it is assumed that a value of N is 6. The six cells are a cell 1, a cell 2, a cell 3, a cell 4, a cell 5, and a cell 6. It is assumed that cell quality of the six cells is respectively −62 dBm, −63.5 dBm, −59 dBm, −64 dBm, −62 dBm, and −63.5 dBm. It can be learned that, the cell quality of the cell 3 has a largest value of the cell quality of the six cells. It is assumed that the first preset value is 2 dBm. A difference between the largest value of the cell quality and the first preset value is −61 dBm. In this case, only an absolute value of a difference between the cell quality of the cell 3 and the largest value of the cell quality is less than 2 dBm. Therefore, the target cell includes only the cell 3.

Optionally, in some embodiments, the preset value is a first preset value, and the determining a target cell based on measurement results of N measured cells and a preset value includes: determining a cell in the N cells as the target cell, where an absolute value of a difference between cell quality of the cell and cell quality of a second cell is less than or equal to the first preset value, and the second cell is a cell with best cell quality in the N cells.

For example, it is assumed that a value of N is 6. The six cells are a cell 1, a cell 2, a cell 3, a cell 4, a cell 5, and a cell 6. It is assumed that cell quality of the six cells is respectively −62 dBm, −63.5 dBm, −59 dBm, −64 dBm, −61 dBm, and −59.5 dBm. It can be learned that, the cell quality of the cell 3 has a largest value of the cell quality of the six cells. It is assumed that the first preset value is 2 dBm. A difference between the largest value of the cell quality and the first preset value is −61 dBm. In this case, the cell quality of the cell 3, the cell 5, and the cell 6 is all greater than or equal to −61 dBm. Therefore, the target cells include the cell 3, the cell 5, and the cell 6.

Optionally, in some embodiments, the preset value is a second preset value, and the determining a target cell based on measurement results of N measured cells and a preset value includes: determining a quantity of good beams in each of the N cells, where the good beam is a beam whose beam quality is greater than a good-beam threshold; determining a largest value of the quantities of good beams in the N cells; and determining a cell in the N cells as the target cell, where an absolute value of a difference between a quantity of good beams in the cell and the largest value of the quantities of good beams is less than the second preset value.

For example, it is assumed that a value of N is 6. The six cells are a cell 1, a cell 2, a cell 3, a cell 4, a cell 5, and a cell 6. Quantities of good beams in the six cells are respectively 5, 1, 2, 4, 5, and 4. In this case, the largest value of the quantities of good beams is 5. If the second preset value is 2, a difference between the largest value of the quantities of good beams and the second preset value is 3. It can be learned that, the quantity of good beams in the cell 1, the quantity of good beams in the cell 4, the quantity of good beams in the cell 5, and the quantity of good beams in the cell 6 are all greater than 3. Therefore, the target cells include the cell 1, the cell 4, the cell 5, and the cell 6.

It may be understood that, in some cases, only the quantity of good beams in the cell whose quantity of good beams has the largest value may be greater than the difference between the largest value of the quantities of good beams and the second preset value. In this case, the target cell includes only the cell whose quantity of good beams is the largest.

For example, it is assumed that a value of N is 6. The six cells are a cell 1, a cell 2, a cell 3, a cell 4, a cell 5, and a cell 6. Quantities of good beams in the six cells are respectively 5, 1, 2, 2, 1, and 2. In this case, the largest value of the quantities of good beams is 5. If the second preset value is 2, a difference between the largest value of the quantities of good beams and the second preset value is 3. It can be learned that, only the quantity of good beams in the cell 1 is greater than 3. Therefore, the target cell includes only the cell 1.

Optionally, in some embodiments, the preset value is a second preset value, and the determining a target cell based on measurement results of N measured cells and a preset value includes: determining a quantity of good beams in each of the N cells, where the good beam is a beam whose beam quality is greater than a good-beam threshold; determining a largest value of the quantities of good beams in the N cells; and determining a cell in the N cells as the target cell, where an absolute value of a difference between a quantity of good beams in the cell and the largest value of the quantities of good beams is less than or equal to the second preset value.

For example, it is assumed that a value of N is 6. The six cells are a cell 1, a cell 2, a cell 3, a cell 4, a cell 5, and a cell 6. Quantities of good beams in the six cells are respectively 5, 1, 2, 4, 3, and 4. In this case, the largest value of the quantities of good beams is 5. If the second preset value is 2, a difference between the largest value of the quantities of good beams and the second preset value is 3. It can be learned that, the quantity of good beams in the cell 1, the quantity of good beams in the cell 4, the quantity of good beams in the cell 5, and the quantity of good beams in the cell 6 are all greater than 3. Therefore, the target cells include the cell 1, the cell 4, the cell 5, and the cell 6.

Optionally, in some embodiments, a value of the good-beam threshold may be the same as a value of the preset beam threshold in the trigger condition. In other words, the preset beam threshold in the trigger condition is the good-beam threshold.

Optionally, in some other embodiments, a value of the good-beam threshold may be different from a value of the preset beam threshold in the trigger condition. The base station may indicate the good-beam threshold to the terminal by using the measurement configuration.

Optionally, in some embodiments, the preset value is a third preset value, and the determining a target cell based on measurement results of N measured cells and a preset value includes: determining adjusted cell quality of each of the N cells based on the measurement event; and determining a cell in the N cells as the target cell, where an absolute value of a difference between adjusted cell quality of the cell and the trigger threshold is less than the third preset value.

A method for determining the adjusted cell quality during determining of the target cell is the same as the method for determining the adjusted cell quality during determining of whether cell quality satisfies the trigger condition. The trigger threshold is the trigger threshold used during determining of whether the cell quality satisfies the trigger condition.

For example, if the measurement event is A3, the adjusted cell quality of each of the N cells may be determined according to the formula 1.1. The trigger threshold may be determined according to the formula 1.2. If the N cells include the serving cell of the terminal, the adjusted cell quality of the serving cell may also be determined according to the formula 1.1.

For another example, if the measurement event is A4, the adjusted cell quality of each of the N cells may be determined according to the formula 1.1, and the trigger threshold may be received from the base station. If the N cells include the serving cell of the terminal, the adjusted cell quality of the serving cell may also be determined according to the formula 1.1.

For another example, if the measurement event is A5, the adjusted cell quality of each of the N cells may be determined according to the formula 1.1, the trigger threshold is the second trigger threshold, and the second trigger threshold may be received from the base station. If the N cells include the serving cell of the terminal, the adjusted cell quality of the serving cell may also be determined according to the formula 1.1.

For another example, if the measurement event is A6, the adjusted cell quality of each of the N cells may be determined according to the formula 1.4. The trigger threshold may be determined according to the formula 1.5. If the N cells include the serving cell of the terminal, the adjusted cell quality of the serving cell may also be determined according to the formula 1.4.

For example, it is assumed that a value of N is 6. The six cells are a cell 1, a cell 2, a cell 3, a cell 4, a cell 5, and a cell 6. It is assumed that adjusted cell quality of the six cells is respectively −62 dBm, −63.5 dBm, −59 dBm, −64 dBm, −60 dBm, and −59.5 dBm. Assuming that the trigger threshold is −59 dBm, and the third preset value is 2 dBm, a difference between the trigger threshold and the third preset value is −61 dBm. In this case, the cell quality of the cell 3, the cell 5, and the cell 6 is all greater than −61 dBm. Therefore, the target cells include the cell 3, the cell 5, and the cell 6.

Optionally, in some embodiments, the preset value is a third preset value, and the determining a target cell based on a measurement result of each of the N cells and a preset value includes: determining adjusted cell quality of each of the N cells based on the measurement event; and determining a cell in the N cells as the target cell, where an absolute value of a difference between adjusted cell quality of the cell and the trigger threshold is less than or equal to the third preset value.

For example, it is assumed that a value of N is 6. The six cells are a cell 1, a cell 2, a cell 3, a cell 4, a cell 5, and a cell 6. It is assumed that adjusted cell quality of the six cells is respectively −62 dBm, −63.5 dBm, −59 dBm, −64 dBm, −61 dBm, and −59.5 dBm. Assuming that the trigger threshold is −59 dBm, and the third preset value is 2 dBm, a difference between the trigger threshold and the third preset value is −61 dBm. In this case, the cell quality of the cell 3, the cell 5, and the cell 6 is all greater than or equal to −61 dBm. Therefore, the target cells include the cell 3, the cell 5, and the cell 6.

Optionally, in some embodiments, the preset value is a target cell quality threshold, and the determining a target cell based on measurement results of N measured cells and a preset value includes: determining adjusted cell quality of each of the N cells based on the measurement event; and determining a cell whose adjusted cell quality is greater than the preset target cell threshold as the target cell.

A method for determining the adjusted cell quality is the same as the method for determining the adjusted cell quality in operation 102.

For example, if the measurement event is A3, the adjusted cell quality of each of the N cells may be determined according to the formula 1.1. If the N cells include the serving cell of the terminal, the adjusted cell quality of the serving cell may also be determined according to the formula 1.1.

For another example, if the measurement event is A4, the adjusted cell quality of each of the N cells may be determined according to the formula 1.1. If the N cells include the serving cell of the terminal, the adjusted cell quality of the serving cell may also be determined according to the formula 1.1.

For another example, if the measurement event is A5, the adjusted cell quality of each of the N cells may be determined according to the formula 1.1. If the N cells include the serving cell of the terminal, the adjusted cell quality of the serving cell may also be determined according to the formula 1.1.

For another example, if the measurement event is A6, the adjusted cell quality of each of the N cells may be determined according to the formula 1.4. If the N cells include the serving cell of the terminal, the adjusted cell quality of the serving cell may also be determined according to the formula 1.4.

For example, it is assumed that a value of N is 6. The six cells are a cell 1, a cell 2, a cell 3, a cell 4, a cell 5, and a cell 6. It is assumed that adjusted cell quality of the six cells is respectively −62 dBm, −63.5 dBm, −59 dBm, −64 dBm, −60 dBm, and −59.5 dBm. Assuming that the preset target cell threshold is −61 dBm, the cell quality of the cell 3, the cell 5, and the cell 6 is all greater than −61 dBm. Therefore, the target cells include the cell 3, the cell 5, and the cell 6.

Optionally, in some embodiments, the preset value is a preset target cell threshold, and the determining a target cell based on measurement results of N measured cells and a preset value includes: determining adjusted cell quality of each of the N cells based on the measurement event; and determining a cell whose adjusted cell quality is greater than or equal to the preset target cell threshold as the target cell.

For example, it is assumed that a value of N is 6. The six cells are a cell 1, a cell 2, a cell 3, a cell 4, a cell 5, and a cell 6. It is assumed that adjusted cell quality of the six cells is respectively −62 dBm, −63.5 dBm, −59 dBm, −64 dBm, −61 dBm, and −59.5 dBm. Assuming that the preset target cell threshold is −61 dBm, the cell quality of the cell 3, the cell 5, and the cell 6 is all greater than or equal to −61 dBm. Therefore, the target cells include the cell 3, the cell 5, and the cell 6.

Optionally, in some embodiments, the preset value includes a value $M_1$, and the determining a target cell based on measurement results of N measured cells and a preset value includes: determining $M_2$ of the N cells as the target cells, where cell quality of any one of the target cells is greater than or equal to cell quality of any non-target cell, and the non-target cell is a cell not belonging to the target cells in the N cells, where $M_1$ is a positive integer greater than or equal to 1, $M_2$ is a positive integer greater than or equal to 1, and $M_2$ is less than or equal to both N and $M_1$.

Optionally, in some embodiments, the value $M_1$ represents a quantity of cells included in the target cells. Optionally, in some embodiments, a value of $M_1$ is greater than a value of N. In this case, the N cells are all the target cells. In other words, a value of $M_2$ is equal to N. In some other embodiments, a value of $M_1$ is less than a value of N. In this case, during determining of the target cells, the cell quality of the N cells may be sorted in descending order, and top $M_1$ cells are the target cells.

For example, it is assumed that a value of N is 6. The six cells are a cell 1, a cell 2, a cell 3, a cell 4, a cell 5, and a cell 6. It is assumed that cell quality of the six cells is respectively −62 dBm, −63.5 dBm, −59 dBm, −64 dBm, −60 dBm, and −59.5 dBm. Assuming that the value of $M_1$ is 3, the target cells include three cells. The three cells are respectively the cell 3, the cell 5, and the cell 6.

However, in some cases, there may be cells with the same cell quality. For example, it is assumed that a value of N is 6. The six cells are a cell 1, a cell 2, a cell 3, a cell 4, a cell 5, and a cell 6. It is assumed that cell quality of the six cells is respectively −62 dBm, −63.5 dBm, −59 dBm, −60 dBm, −60 dBm, and −59.5 dBm. It is assumed that the value of $M_1$ is 3. In this case, if the cell quality of the six cells is sorted in descending order, rankings of the cell quality of the cell 4 and the cell 5 are the same, and the cell 4 and the cell 5 are both cells with the third highest cell quality. However, the target cells include only three cells. In this case, it may be determined that either of the cell 4 and the cell 5 belongs to the target cells.

Optionally, in some embodiments, the value $M_1$ represents a ranking of cell quality when the cell quality is sorted in descending order based on in the target cells. If a ranking of cell quality of a cell in the N cells is higher than or equal to $M_1$, the cell belongs to the target cells.

In some embodiments, the value of $M_1$ is greater than the value of N. In this case, the N cells are all the target cells. In other words, the value of $M_2$ is equal to N. In some other embodiments, the value of $M_1$ is less than the value of N. In this case, the value of $M_2$ may be equal to the value of $M_1$, or may be greater than the value of $M_1$. However, the value of $M_2$ is less than the value of N.

For example, it is assumed that a value of N is 6. The six cells are a cell 1, a cell 2, a cell 3, a cell 4, a cell 5, and a cell 6. It is assumed that cell quality of the six cells is respectively −62 dBm, −63.5 dBm, −59 dBm, −64 dBm, −60 dBm, and −59.5 dBm. Assuming that the value of $M_1$ is 3, the target cells include three cells. The three cells are the cell 3, the cell 5, and the cell 6. In this case, the value of $M_1$ is the same as the value of $M_2$.

For another example, it is assumed that a value of N is 6. The six cells are a cell 1, a cell 2, a cell 3, a cell 4, a cell 5, and a cell 6. It is assumed that cell quality of the six cells is respectively −62 dBm, −63.5 dBm, −59 dBm, −60 dBm, −60 dBm, and −59.5 dBm. It is assumed that the value of $M_1$ is 3. In this case, if the cell quality of the six cells is sorted in descending order, rankings of the cell quality of the cell 4 and the cell 5 are the same, and the cell 4 and the cell 5 are both cells with the third highest cell quality. In this case, the target cells include four cells that are the cell 3, the cell 4, the cell 5, and the cell 6.

Optionally, in some embodiments, the preset value includes a value $M_1$, and the determining a target cell based on a measurement result of each of the N cells and a preset value includes: determining $M_2$ of the N cells as the target cells, where adjusted cell quality of any one of the target cells is greater than or equal to adjusted cell quality of any cell other than the target cells in the N cells, where $M_1$ is a positive integer greater than or equal to 1, $M_2$ is a positive integer greater than or equal to 1, and $M_2$ is less than or equal to both N and $M_1$.

Optionally, in some embodiments, the value $M_1$ represents a quantity of cells included in the target cells. Optionally, in some embodiments, a value of $M_1$ is greater than a value of N. In this case, the N cells are all the target cells. In other words, a value of $M_2$ is equal to N. In some other embodiments, a value of $M_1$ is less than a value of N. In this case, during determining of the target cells, the adjusted cell quality of the N cells may be sorted in descending order, and top $M_1$ cells are the target cells.

For example, it is assumed that a value of N is 6. The six cells are a cell 1, a cell 2, a cell 3, a cell 4, a cell 5, and a cell 6. It is assumed that adjusted cell quality of the six cells is respectively −62 dBm, −63.5 dBm, −59 dBm, −64 dBm, −60 dBm, and −59.5 dBm. Assuming that the value of $M_1$ is 3, the target cells include three cells. The three cells are the cell 3, the cell 5, and the cell 6.

However, in some cases, there may be cells with the same adjusted cell quality. For example, it is assumed that a value of N is 6. The six cells are a cell 1, a cell 2, a cell 3, a cell 4, a cell 5, and a cell 6. It is assumed that adjusted cell quality of the six cells is respectively −62 dBm, −63.5 dBm, −59 dBm, −60 dBm, −60 dBm, and −59.5 dBm. It is assumed that the value of $M_1$ is 3. In this case, if the adjusted cell quality of the six cells is sorted in descending order, rankings of the adjusted cell quality of the cell 4 and the cell 5 are the same, and the cell 4 and the cell 5 are both cells with the third highest adjusted cell quality. However, the target cells include only three cells. In this case, it may be determined that either of the cell 4 and the cell 5 belongs to the target cells.

Optionally, in some embodiments, the value $M_1$ represents a ranking of adjusted cell quality when the adjusted cell quality is sorted in descending order in the target cells. If a ranking of adjusted cell quality of a cell in the N cells is higher than or equal to $M_1$, the cell belongs to the target cells.

In some embodiments, the value of $M_1$ is greater than the value of N. In this case, the N cells are all the target cells. In other words, the value of $M_2$ is equal to N. In some other embodiments, the value of $M_1$ is less than the value of N. In this case, the value of $M_2$ may be equal to the value of $M_1$, or may be greater than the value of $M_1$. However, the value of $M_2$ is less than the value of N.

For example, it is assumed that a value of N is 6. The six cells are a cell 1, a cell 2, a cell 3, a cell 4, a cell 5, and a cell 6. It is assumed that adjusted cell quality of the six cells is respectively −62 dBm, −63.5 dBm, −59 dBm, −64 dBm, −60 dBm, and −59.5 dBm. Assuming that the value of $M_1$ is 3, the target cells include three cells. The three cells are the cell 3, the cell 5, and the cell 6. In this case, the value of $M_1$ is the same as the value of $M_2$.

For another example, it is assumed that a value of N is 6. The six cells are a cell 1, a cell 2, a cell 3, a cell 4, a cell 5, and a cell 6. It is assumed that adjusted cell quality of the six cells is respectively −62 dBm, −63.5 dBm, −59 dBm, −60 dBm, −60 dBm, and −59.5 dBm. It is assumed that the value of $M_1$ is 3. In this case, if the adjusted cell quality of the six cells is sorted in descending order, rankings of the adjusted cell quality of the cell 4 and the cell 5 are the same, and the cell 4 and the cell 5 are both cells with the third highest adjusted cell quality. In this case, the target cells include four cells that are the cell 3, the cell 4, the cell 5, and the cell 6.

In some other embodiments, the preset value may alternatively include a value $M_3$, and the value $M_3$ may represent a quantity of good beams included in the target cell or a ranking obtained by sorting quantities of good beams in descending order. A specific implementation is similar to the implementation for the value $M_1$, and details are not described herein again.

Optionally, in some embodiments, the preset value may alternatively include a value $M_4$. The target cells may be $M_4$ cells, in the N cells, whose measurement results are first obtained, where $M_4$ is a positive integer greater than or equal to 1. That is, in this case, the target cells may be determined without determining measurement results of all the cells, as long as the measurement results of the $M_4$ cells are obtained.

Optionally, the preset value may include two or more of the foregoing content (e.g., the first preset value, the second preset value, the third preset value, the preset target cell threshold, the value $M_1$, and the like). For example, the preset value may include the first preset value and the second preset value. For another example, the preset value may include the second preset value and the third preset value. For another example, the preset value may include the first preset value, the second preset value, and the value $M_1$. Examples are not listed one by one herein.

Optionally, in some embodiments, when the preset value includes two or more of the foregoing content, as long as a cell satisfies one of the two or more of the foregoing content, the cell satisfies the preset condition.

For example, it is assumed that a value of N is 6. The six cells are a cell 1, a cell 2, a cell 3, a cell 4, a cell 5, and a cell 6. It is assumed that adjusted cell quality of the six cells is respectively −62 dBm, −63.5 dBm, −59 dBm, −64 dBm, −61 dBm, and −59.5 dBm. It is assumed that the preset condition includes the first preset value and the value $M_1$, the first preset value is − 1 dBm, and the value of $M_1$ is 3. In this case, the cell 3 and the cell 6 are cells whose cell quality is greater than −60 dBm. Although the cell quality of the cell 5 is less than −61 dBm, the cell 5 is a cell whose cell quality ranks the third (where the cell quality is sorted in descending order). Therefore, the cell 5 also belongs to the target cells. In this case, the target cells include three cells. The three cells are the cell 3, the cell 5, and the cell 6.

Optionally, in some other embodiments, when the preset condition includes two or more of the foregoing content, a cell satisfies the preset condition only when the cell satisfies all the two or more of the foregoing content.

For example, it is assumed that a value of N is 6. The six cells are a cell 1, a cell 2, a cell 3, a cell 4, a cell 5, and a cell 6. It is assumed that adjusted cell quality of the six cells is respectively −62 dBm, −63.5 dBm, −59 dBm, −64 dBm, −61 dBm, and −59.5 dBm. It is assumed that the preset condition includes the first preset value and the value $M_1$, the first preset value is −1 dBm, and the value of $M_1$ is 3. In this case, the cell 3 and the cell 6 are cells whose cell quality is greater than −60 dBm. Although the cell 5 is a cell whose cell quality ranks the third (where the cell quality is sorted in descending order), the cell quality of the cell 5 is less than −61 dBm. Therefore, the cell 5 does not belong to the target cells. In this case, the target cells include two cells. The two cells are the cell 3 and the cell 6.

103. Send a measurement result of the target cell to the base station.

Optionally, a measurement result of the serving cell of the terminal may also be sent to the base station.

Optionally, a measurement result of the first cell may also be sent to the base station.

It may be understood that, the target cell may include the first cell. When the target cell includes the first cell, the measurement result, of the target cell, sent to the base station already includes the measurement result of the first cell. Alternatively, the target cell may not include the first cell. In this case, in addition to sending the measurement result of the target cell to the base station, the terminal further sends the measurement result of the first cell to the base station. In a possible manner, regardless of whether the target cell includes the first cell, the measurement result of the first cell and a measurement result of a cell other than the first cell in the target cells may be included in different fields.

Optionally, the target cell may also include the serving cell. When the target cell includes the serving cell, the measurement result, of the target cell, sent to the base station already includes the measurement result of the serving cell. Alternatively, the target cell may not include the serving cell. In this case, in addition to sending the measurement result of the target cell to the base station, the terminal further sends the measurement result of the serving cell to the base station. In a possible manner, regardless of whether the target cell includes the serving cell, the measurement result of the serving cell and a measurement result of a cell other than the serving cell in the target cells may be included in different fields.

The serving cell of the terminal and the first cell may be the same or different.

Optionally, the target cell may include the serving cell of the terminal and/or the first cell.

In other words, in some cases, the serving cell of the terminal, the cell satisfying the trigger condition, and the target cell may be different cells. In some other cases, two or all of the serving cell of the terminal, the cell satisfying the trigger condition, and the target cell may be the same.

For example, it is assumed that a value of N is 6. The six cells are a cell 1, a cell 2, a cell 3, a cell 4, a cell 5, and a cell 6. It is assumed that cell quality of the six cells is respectively −62 dBm, −61.5 dBm, −59 dBm, −64 dBm, −60 dBm, and −59.5 dBm. It is assumed that the cell 1 is the serving cell, and the cell 2 is the cell satisfying the trigger condition. It is assumed that the target condition includes the first preset value, and the first preset value is 2. In this case, the cell quality of the cell 3, the cell 5, and the cell 6 is all greater than −61 dBm. Therefore, the target cells include the cell 3, the cell 5, and the cell 6. In this case, the serving cell of the terminal, the cell satisfying the trigger condition, and the target cell are different cells.

For another example, it is assumed that a value of N is 6. The six cells are a cell 1, a cell 2, a cell 3, a cell 4, a cell 5, and a cell 6. It is assumed that cell quality of the six cells is respectively −62 dBm, −61.5 dBm, −59 dBm, −64 dBm, −60 dBm, and −59.5 dBm. It is assumed that the cell 1 is the serving cell, and the cell 3 is the cell satisfying the trigger condition. It is assumed that the target condition includes the first preset value, and the first preset value is 2. In this case, the cell quality of the cell 3, the cell 5, and the cell 6 is all greater than −61 dBm. Therefore, the target cells include the cell 3, the cell 5, and the cell 6. In this case, the target cells include the cell satisfying the trigger condition.

For another example, it is assumed that a value of N is 6. The six cells are a cell 1, a cell 2, a cell 3, a cell 4, a cell 5, and a cell 6. It is assumed that cell quality of the six cells is respectively −62 dBm, −61.5 dBm, −59 dBm, −64 dBm, −60 dBm, and −59.5 dBm. It is assumed that the cell 6 is the serving cell, and the cell 3 is the cell satisfying the trigger condition. It is assumed that the target condition includes the first preset value, and the first preset value is 2. In this case, the cell quality of the cell 3, the cell 5, and the cell 6 is all greater than −61 dBm. Therefore, the target cells include the cell 3, the cell 5, and the cell 6. In this case, the target cells include the cell satisfying the trigger condition and the serving cell of the terminal.

For another example, it is assumed that a value of N is 6. The six cells are a cell 1, a cell 2, a cell 3, a cell 4, a cell 5, and a cell 6. It is assumed that cell quality of the six cells is respectively −62 dBm, −61.5 dBm, −57 dBm, −64 dBm, −60 dBm, and −59.5 dBm. It is assumed that the cell 3 is the serving cell, and the cell 3 is the cell satisfying the trigger condition. It is assumed that the target condition includes the first preset value, and the first preset value is 2. Only the cell quality of the cell 3 is greater than −59 dBm. Therefore, the serving cell of the terminal, the cell satisfying the trigger condition, and the target cell are a same cell, that is, the cell 3.

Optionally, in some embodiments, the measurement result may further include beam quality of each beam.

Optionally, the measurement result of the serving cell of the terminal, a measurement result of the cell satisfying the trigger condition, and the measurement result of the target cell may be carried in one message. For example, a measurement report may be sent to the base station. The measurement report carries the measurement result of the serving cell of the terminal, the measurement result of the cell satisfying the trigger condition, and the measurement result of the target cell.

Optionally, the measurement result of the serving cell of the terminal, the measurement result of the cell satisfying the trigger condition, and the measurement result of the target cell may be carried in different messages. For example, a first measurement report, a second measurement report, and a third measurement report may be sent to the base station. The first measurement report carries the measurement result of the serving cell of the terminal, the second measurement report carries the measurement result of the cell satisfying the trigger condition, and the third measurement report carries the measurement result of the target cell.

Optionally, in some embodiments, as long as one or more measurement results that need to be sent to the base station are determined, the determined measurement results may be sent to the base station.

Optionally, in some other embodiments, after all measurement results that need to be sent to the base station are determined, the measurement results may be sent to the base station.

It may be understood that, the measurement result reported by the terminal may be used by the base station to indicate the terminal to be properly handed over between cells. In an embodiment, the base station may determine, based on the measurement result of the target cell, whether to change the serving cell of the terminal. If it is determined that the serving cell of the terminal needs to be changed, a target serving cell that needs to be handed over to may be selected based on the measurement result. For example, the base station may select a cell with a largest quantity of good beams as the target serving cell to which the terminal needs to be handed over. For another example, the base station may select a cell with best cell quality as the target serving cell to which the terminal needs to be handed over. For another example, the base station may evaluate cells based on cell quality and quantities of good beams, and determine a cell with a highest comprehensive evaluation as the target serving cell.

Based on the method shown in FIG. 1, when sending the measurement result to the base station, in addition to sending the measurement result of the cell satisfying the report trigger condition, the terminal may further send, to the base station, a measurement result of another cell that may be used as the target serving cell. The cell satisfying the report trigger condition may not be a cell with a largest quantity of good beams and/or a cell with best cell quality. Based on the foregoing technical solution, the base station may select, based on measurement results, reported by the terminal, of a plurality of cells, a suitable cell as the target serving cell to which the terminal needs to be handed over; and then change the serving cell of the terminal to the target serving cell.

Figure 2:
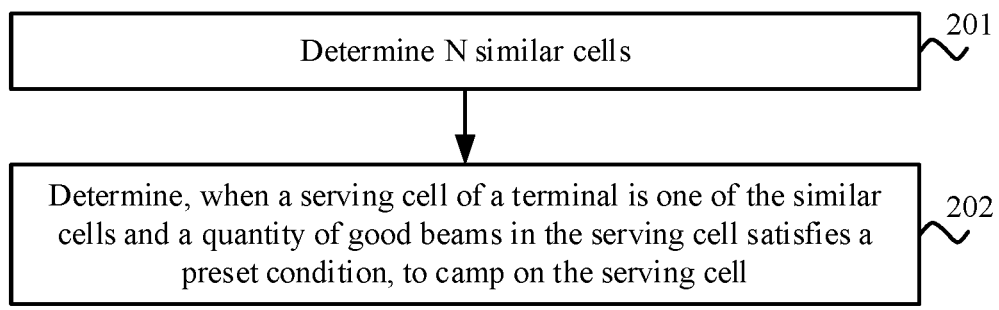
FIG. 2 is a schematic flowchart of another communication method according to an embodiment of the application.

FIG. 2 is a schematic flowchart of another communication method according to an embodiment of the application. When the method shown in FIG. 2 is described, some operations are described by using a terminal as an execution body. However, this is only for ease of description of the method shown in FIG. 2. The method shown in FIG. 2 may be implemented by a terminal, or may be implemented by a component (e.g., a chip or a circuit) that can be used in a terminal.

201. Determine N similar cells, where the N similar cells include a third cell and a cell, where an absolute value of a difference between cell quality of the cell and cell quality of the third cell is less than a cell quality preset value.

In an embodiment, cell quality of M cells may be first determined, and a largest value Qmax of the M pieces of cell quality is determined. A cell corresponding to Qmax is the third cell. In other words, the third cell is a cell with best cell quality in the M cells. The terminal determines the cell in the M cells as the similar cell, where the absolute value of a difference between cell quality of the cell and the cell quality of the third cell is less than the cell quality preset value. M is a positive integer greater than or equal to N, and N is a positive integer greater than or equal to 1. For example, a value of M is 6. The six cells are a cell 1, a cell 2, a cell 3, a cell 4, a cell 5, and a cell 6. It is assumed that cell quality of the six cells is respectively −62 dBm, −63.5 dBm, −59 dBm, −64 dBm, −60 dBm, and −59.5 dBm. It can be learned that, the cell quality of the cell 3 has a largest value of the cell quality of the six cells. It is assumed that the preset value is 2 dBm. Therefore, a difference between −59 dBm and 2 dBm is −61 dBm. It can be learned that, the cell quality of the cell 5 and the cell quality of the cell 6 are both less than −61 dBm. Therefore, the cell 3, the cell 5, and the cell 6 are the similar cells.

Optionally, in some embodiments, an average value of beam quality of K beams whose beam quality is greater than a preset threshold in one cell may be determined, where K is a positive integer greater than or equal to 1. The average value is cell quality of the cell. The threshold and a value of K may be sent to the terminal by a base station by using a measurement configuration. The average value of the beam quality of the K beams may be one of an arithmetic average value, a geometric average value, a weighted average value, and the like. This is not limited in an embodiment of the application. If in a cell, a quantity of beams whose beam quality is greater than the preset threshold is less than K, cell quality of the cell is an average value of beam quality of all beams in the cell.

Optionally, in some other embodiments, an average value of beam quality of K beams whose beam quality is greater than a preset threshold in one cell may be determined, and then layer 3 filtering is performed on the average value. A value obtained through the layer 3 filtering is cell quality of the cell. The threshold and a value of K may be sent to the terminal by a base station by using a measurement configuration. Alternatively, the threshold and a value of K may be preset. The average value of the K beams may be one of an arithmetic average value, a geometric average value, a weighted average value, and the like. This is not limited in an embodiment of the application. If in a cell, a quantity of beams whose beam quality is greater than the preset threshold is less than K, cell quality of the cell is a result obtained after layer 3 filtering is performed on an average value of beam quality of all beams in the cell.

Optionally, in some other embodiments, the cell quality in an embodiment shown in FIG. 2 may alternatively be a ranking value. A ranking value of a serving cell and a ranking value of a neighboring cell may be determined according to the following formulas:

$$Rs = Qmeas,s + Qhyst \qquad \text{(formula 2.1)}$$

$$Rn = Qmeas,n - Qoffset \qquad \text{(formula 2.2)}$$

Rs represents the ranking value of the serving cell, and Rn represents the ranking value of the neighboring cell. Qmeas,s and Qmeas,n are respectively cell quality of the serving cell and cell quality of the neighboring cell. Qhyst represents a hysteresis value, and Qoffset represents an offset. Qoffset may be a cell-level offset, or a frequency-level offset, or a cell-level offset plus a frequency-level offset. Qmeas,s and Qmeas,n may be cell quality (e.g., the average value of the K pieces of beam quality or the value obtained after the layer 3 filtering is performed on the average value of the K pieces of beam quality) obtained by using the foregoing method.

It may be understood that, before operation 201, a measurement process needs to be started. Optionally, in some embodiments, the measurement process may be started based on a stipulation in a current standard. For example, for a frequency layer and system whose priorities are higher than a priority of the serving cell, cells on the frequency layer and in the system are always measured. If a level value obtained through calculation in a process of selecting or reselecting a serving cell is less than or equal to a first preset level value, measurement of an intra-frequency cell of the serving cell is determined to be started. If the level value obtained through calculation in the process of selecting or reselecting the serving cell is less than or equal to a second preset level value, or the second preset level value is not configured, measurement of a cell at a frequency whose priority is the same as or lower than a priority of a frequency of the serving cell and measurement of a cell in a system whose priority is the same as or lower than the priority of the frequency of the serving cell is started.

The M cells are cells that need to be measured in a corresponding measurement process.

Optionally, in some embodiments, a condition for starting the measurement process may further include: determining that a quantity of good beams in the serving cell is less than a measurement start threshold. In other words, before operation 401, the method further includes: determining that a quantity of good beams in the serving cell is less than a measurement start threshold.

In an embodiment, whether the quantity of good beams in the serving cell is less than the measurement start threshold is determined. If the quantity of good beams in the serving cell is less than the measurement start threshold, it is determined to start measurement of an intra-frequency cell of the serving cell, measurement of a cell at a frequency whose priority is the same as or lower than a priority of a frequency of the serving cell, and measurement of a cell in a system whose priority is the same as or lower than the priority of the frequency of the serving cell.

Optionally, in some embodiments, a condition for starting the measurement process may further include: determining that a quantity of good beams in the serving cell is less than or equal to a measurement start threshold. In other words, before operation 401, the method further includes: determining that a quantity of good beams in the serving cell is less than or equal to a measurement start threshold.

In an embodiment, whether the quantity of good beams in the serving cell is less than or equal to the measurement start threshold is determined. If the quantity of good beams in the serving cell is less than or equal to the measurement start threshold, it is determined to start measurement of an intra-frequency cell of the serving cell, measurement of a cell at a frequency whose priority is the same as or lower than a priority of a frequency of the serving cell, and measurement of a cell in a system whose priority is the same as or lower than the priority of the frequency of the serving cell.

202. Determine, when the serving cell of the terminal is one of the similar cells and the quantity of good beams in the serving cell satisfies a preset condition, to camp on the serving cell.

Optionally, in some embodiments, the determining, when the serving cell of the terminal is one of the similar cells and the quantity of good beams in the serving cell satisfies a preset condition, to camp on the serving cell includes: determining, when the serving cell of the terminal is one of the similar cells and the quantity of good beams in the serving cell is greater than a first preset value, to camp on the serving cell.

Optionally, in some other embodiments, the determining, when the serving cell of the terminal is one of the similar cells and the quantity of good beams in the serving cell satisfies a preset condition, to camp on the serving cell includes: determining, when the serving cell of the terminal is one of the similar cells and the quantity of good beams in the serving cell is greater than or equal to a quantity of good beams in any one of the N similar cells, to camp on the serving cell.

For example, a cell with a largest quantity of good beams in the N similar cells may be determined. If the serving cell is a cell with the largest quantity of good beams in the N similar cells, the serving cell may be determined to be camped on. If the serving cell is not a cell with the largest quantity of good beams in the N similar cell, the serving cell is determined not to be camped on.

For another example, the quantity of good beams in the serving cell may be compared with a quantity of good beams in a cell other than the serving cell in the N similar cells. If it is determined that the N similar cells include a cell whose quantity of good beams is greater than the quantity of good beams in the serving cell, the serving cell is not determined to be camped on. If it is determined that the N similar cells do not include a cell whose quantity of good beams is greater than the quantity of good beams in the serving cell, the serving cell is determined to be camped on.

The method shown in FIG. 2 can effectively reduce a quantity of cell reselections, thereby saving power of the terminal.

Figure 3:
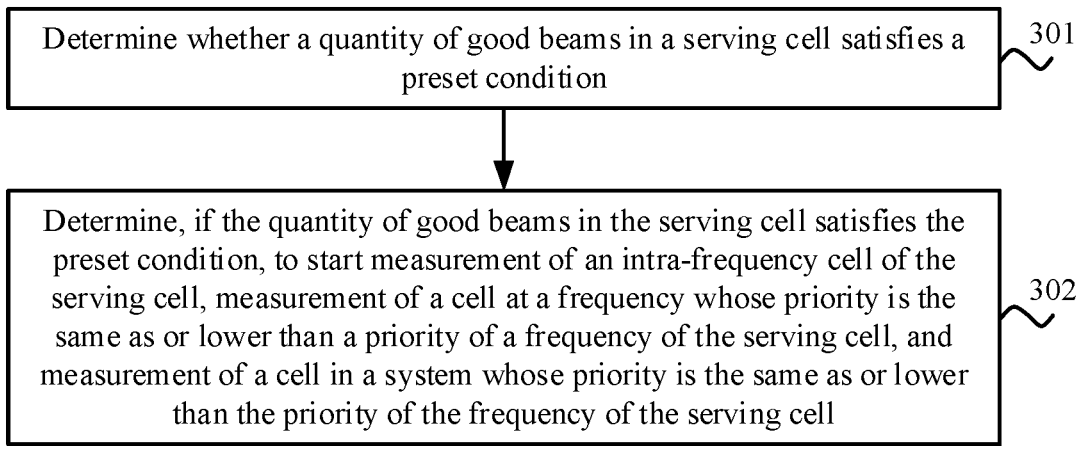
FIG. 3 is a schematic flowchart of a communication method according to an embodiment of the application.

FIG. 3 is a schematic flowchart of a communication method according to an embodiment of the application. The method shown in FIG. 3 may be performed by a terminal, or may be performed by a chip.

301. Determine whether a quantity of good beams in a serving cell satisfies a preset condition.

302. Determine, if the quantity of good beams in the serving cell satisfies the preset condition, to start measurement of an intra-frequency cell of the serving cell, measurement of a cell at a frequency whose priority is the same as or lower than a priority of a frequency of the serving cell, and measurement of a cell in a system whose priority is the same as or lower than the priority of the frequency of the serving cell.

Optionally, in some embodiments, the determining whether a quantity of good beams in a serving cell satisfies a preset condition includes: determining, if it is determined that the quantity of good beams in the serving cell is less than a preset threshold, that the quantity of good beams in the serving cell satisfies the preset condition.

Optionally, in some other embodiments, the determining whether a quantity of good beams in a serving cell satisfies a preset condition includes: determining, if it is determined that the quantity of good beams in the serving cell is less than or equal to a preset threshold, that the quantity of good beams in the serving cell satisfies the preset condition.

Further, if a level value obtained through calculation in a process of selecting or reselecting a serving cell is less than or equal to a first preset level value, measurement of the intra-frequency cell of the serving cell is determined to be started. If a level value obtained through calculation in a process of selecting or reselecting a serving cell is less than or equal to a second preset level value, or the second preset level value is not configured, measurement of a cell at a frequency whose priority is the same as or lower than a priority of a frequency of the serving cell and measurement of a cell in a system whose priority is the same as or lower than the priority of the frequency of the serving cell is determined to be started.

Based on the method shown in FIG. 3, a measurement process may be started when the quantity of good beams in the serving cell does not satisfy the preset threshold, to find a cell with better cell quality as a serving cell of the terminal.

Figure 4:
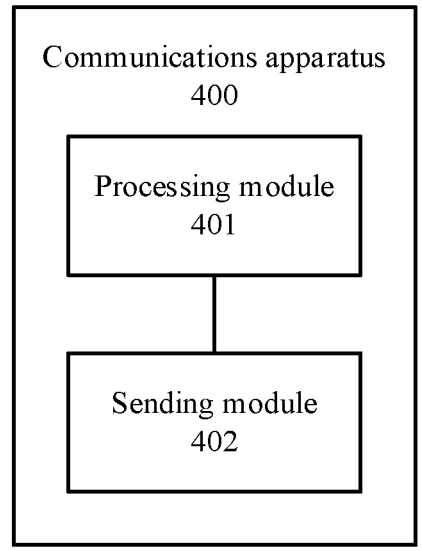
FIG. 4 is a schematic structural diagram of a communications apparatus according to an embodiment of the application.

FIG. 4 is a schematic structural diagram of a communications apparatus 400 according to an embodiment of the application. The communications apparatus may be a terminal, or may be a component (e.g., a chip or a circuit) that can be used in a terminal. As shown in FIG. 4, the communications apparatus 400 may include a processing module 401 and a sending module 402.

The processing module 401 is configured to determine a target cell based on measurement results of N measured cells and a preset value when there is a first cell satisfying a report trigger condition.

The sending module 402 is configured to send a measurement result of the target cell to a base station.

In a possible manner, the processing module 401 may be implemented by a processor, and the sending module 402 may be implemented by a transmitter. For specific functions and beneficial effects of the processing module 401 and the sending module 402, refer to the method shown in FIG. 1. Details are not described herein again.

In a possible embodiment, a communications apparatus is further provided. The communications apparatus may be a terminal, or may be a component (e.g. a chip or a circuit) that can be used in a terminal. The communications apparatus may include a transceiver and a processor, and optionally, may further include a memory. The transceiver may be configured to implement corresponding functions and operations corresponding to the sending module, and the processor may be configured to implement corresponding functions and operations of the processing module. The memory may be configured to store an executable instruction or application program code, and the processor controls execution of the executable instruction or application program code, to implement the communication method provided in the foregoing embodiments of the application; and/or the memory may be configured to temporarily store some data, instruction information, and the like. The memory may exist independent of the processor. In this case, the memory may be connected to the processor via a communications line. In another possible design, the memory may alternatively be integrated with the processor. This is not limited in an embodiment of the application.

Figure 5:
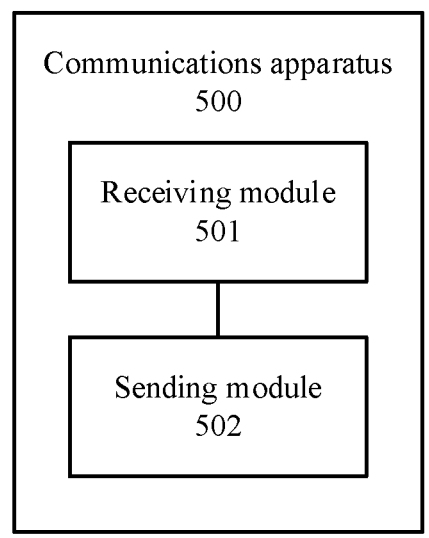
FIG. 5 is a structural block diagram of a communications apparatus according to an embodiment of the application.

FIG. 5 is a structural block diagram of a communications apparatus 500 according to an embodiment of the application. As shown in FIG. 5, the communications apparatus 500 includes a receiving module 501 and a processing module 502.

The receiving module 501 is configured to receive a measurement result of a target cell that is sent by a terminal.

The processing module 502 is configured to determine, based on the measurement result of the target cell, whether to change a serving cell of the terminal.

The receiving module 501 may be implemented by a receiver. The processing module 502 may be implemented by a processor. For specific functions and beneficial effects of the receiving module 501 and the processing module 502, refer to the method shown in FIG. 1. Details are not described herein again.

In a possible embodiment, a communications apparatus is further provided. The communications apparatus may be a base station, or may be a component (e.g. a chip or a circuit) that can be used in a base station. The communications apparatus may include a transceiver and a processor, and optionally, may further include a memory. The transceiver may be configured to implement corresponding functions and operations corresponding to the receiving module, and the processor may be configured to implement corresponding functions and operations of the processing module. The memory may be configured to store an executable instruction or application program code, and the processor controls execution of the executable instruction or application program code, to implement the communication method provided in the foregoing embodiments of the application; and/or the memory may be configured to temporarily store some data, instruction information, and the like. The memory may exist independent of the processor.

In this case, the memory may be connected to the processor via a communications line. In another possible design, the memory may alternatively be integrated with the processor. This is not limited in an embodiment of the application.

Figure 6:
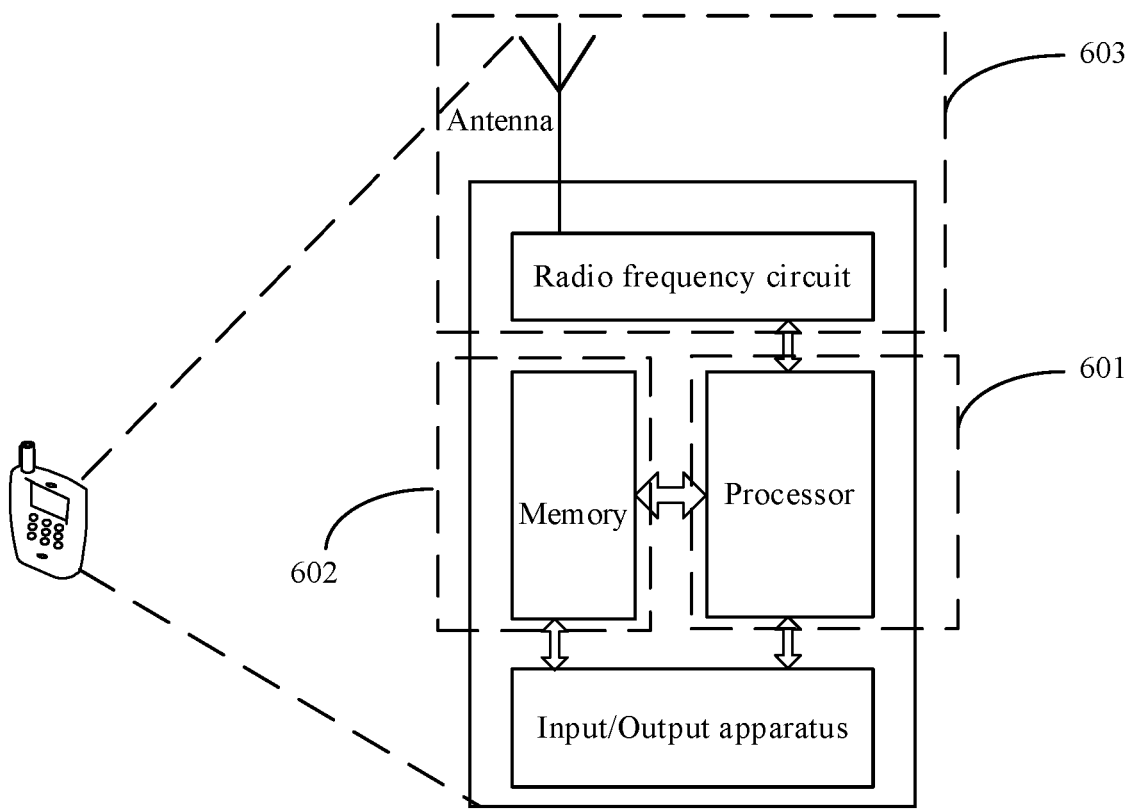
FIG. 6 is a structural block diagram of a terminal according to an embodiment of the application.

FIG. 6 is a structural block diagram of a terminal according to an embodiment of the application. As shown in FIG. 6, the terminal includes a processor 601, a memory 602, a radio frequency circuit, an antenna, and an input/output apparatus. The processor 601 may be configured to process a communication protocol and communication data, and control the terminal to execute a software program, process data of the software program, and so on. The memory 602 is mainly configured to store the software program and the data. The radio frequency circuit is mainly configured to perform conversion between a baseband signal and a radio frequency signal, and process the radio frequency signal. The antenna is mainly configured to receive and send a radio frequency signal that is in an electromagnetic wave form. The input/output apparatus, such as a touchscreen, a display screen, or a keyboard, is mainly configured to receive data entered by a user and output data to the user. It should be noted that some types of terminals may not have an input/output apparatus.

When data needs to be sent, the processor 601 performs baseband processing on the to-be-sent data, and then outputs a baseband signal to the radio frequency circuit. The radio frequency circuit performs radio frequency processing on the baseband signal, and then sends a radio frequency signal in an electromagnetic wave form by using the antenna. When data is sent to the terminal, the radio frequency circuit receives a radio frequency signal by using the antenna, converts the radio frequency signal into a baseband signal, and outputs the baseband signal to the processor. The processor converts the baseband signal into data, and processes the data. For ease of description, FIG. 6 shows only one memory and one processor. In an actual terminal product, there may be one or more processors and one or more memories. The memory may also be referred to as a storage medium, a storage device, or the like. The memory may be disposed independent of the processor, or may be integrated with the processor. This is not limited in an embodiment of the application.

In an embodiment of the application, the antenna having a transceiver function and the radio frequency circuit may be considered as a transceiver 603 of the terminal, and the processor that has a processing function may be considered as a processing unit of the terminal. The transceiver may also be referred to as a transceiver unit, a transceiver, a transceiver apparatus, or the like. The processing unit may also be referred to as a processor, a processing board, a processing module, a processing apparatus, or the like. Optionally, a component that is in the transceiver 603 and that is configured to implement a receiving function may be considered as a receiving unit, and a component that is in the transceiver 603 and that is configured to implement a sending function may be considered as a sending unit. In other words, the transceiver 603 includes the receiving unit and the sending unit. The receiving unit sometimes may also be referred to as a receiver, a receiver, a receiving circuit, or the like. The sending unit sometimes may also be referred to as a transmitter, a transmitter, a transmitter circuit, or the like.

The processor 601, the memory 602, and the transceiver 603 communicate with each other through an internal connection path, to transfer a control and/or data signal.

The foregoing methods disclosed in embodiments of the application may be applied to the processor 601, or may be implemented by the processor 601. The processor 601 may be an integrated circuit chip, and has a signal processing capability. In an implementation process, the operations in the foregoing methods may be implemented by using an integrated logic circuit in a form of hardware in the processor 601, or by using instructions in a form of software.

The processor described in embodiments of the application may be a general purpose processor, a digital signal processor (DSP), an application-specific integrated circuit (ASIC), a field programmable gate array (FPGA) or another programmable logic component, a discrete gate or transistor logic component, or a discrete hardware assembly. The processor may implement or perform the methods, the operations, and logical block diagrams that are disclosed in embodiments of the application. The general purpose processor may be a microprocessor, or may be any conventional processor, or the like. Operations of the methods disclosed with reference to embodiments of the application may be directly performed and completed by a hardware decoding processor, or may be performed and completed by using a combination of hardware and a software module in the decoding processor. The software module may be located in a mature storage medium in the art, such as a random access memory (RAM), a flash memory, a read-only memory (ROM), a programmable read-only memory, an electrically erasable programmable memory, or a register. The storage medium is located in the memory, and the processor reads an instruction in the memory, and completes the operations in the foregoing methods in combination with hardware of the processor.

Optionally, in some embodiments, the memory 602 may store an instruction used to perform the method performed by the terminal in the method shown in FIG. 2. The processor 601 may complete, by executing the instruction stored in the memory 602 in combination with other hardware (for example, the transceiver 603), operations performed by the terminal in the method shown in FIG. 1. For a working process and beneficial effects, refer to the descriptions in an embodiment shown in FIG. 1.

Optionally, in some embodiments, the memory 602 may store an instruction used to perform the method performed by the terminal in the method shown in FIG. 3. The processor 601 may complete, by executing the instruction stored in the memory 602 in combination with other hardware (for example, the transceiver 603), operations performed by the terminal in the method shown in FIG. 2. For a working process and beneficial effects, refer to the descriptions in an embodiment shown in FIG. 2.

Optionally, in some embodiments, the memory 602 may store an instruction used to perform the method performed by the terminal in the method shown in FIG. 1. The processor 601 may complete, by executing the instruction stored in the memory 602 in combination with other hardware (for example, the transceiver 603), operations performed by the terminal in the method shown in FIG. 3. For a working process and beneficial effects, refer to the descriptions in an embodiment shown in FIG. 3.

An embodiment of the application further provides a chip. The chip includes a transceiver unit and a processing unit. The transceiver unit may be an input/output circuit or a communications interface. The processing unit is a processor, a microprocessor, or an integrated circuit integrated into the chip. The chip may perform the method on the terminal side in the foregoing method embodiments.

An embodiment of the application further provides a computer-readable storage medium. The computer-readable storage medium stores an instruction. When the instruction is executed, the method on the terminal side in the foregoing method embodiments is performed.

An embodiment of the application further provides a computer program product including an instruction. When the instruction is executed, the method on the terminal side in the foregoing method embodiments is performed.

Figure 7:
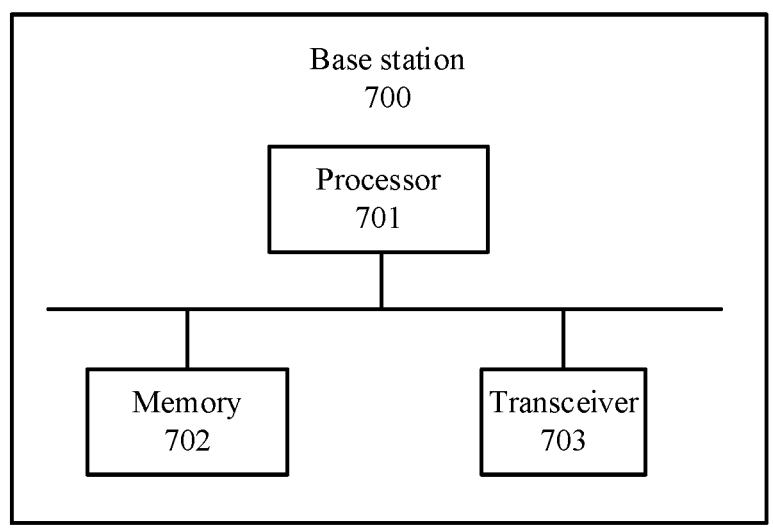
FIG. 7 is a structural block diagram of a base station according to an embodiment of the application.

FIG. 7 is a structural block diagram of a base station 700 according to an embodiment of the application. The base station 700 shown in FIG. 7 includes a processor 701, a memory 702, and a transceiver 703.

The processor 701, the memory 702, and the transceiver 703 communicate with each other through an internal connection path, to transfer a control and/or data signal.

The foregoing methods disclosed in embodiments of the application may be applied to the processor 701, or may be implemented by the processor 701. The processor 701 may be an integrated circuit chip, and has a signal processing capability. In an implementation process, the operations in the foregoing methods may be implemented by using an integrated logic circuit in a form of hardware in the processor 701, or by using instructions in a form of software. The processor 701 may be a general purpose processor, a digital signal processor (DSP), an application-specific integrated circuit (ASIC), a field programmable gate array (FPGA) or another programmable logic component, a discrete gate or transistor logic component, or a discrete hardware assembly. The processor may implement or perform the methods, the operations, and logical block diagrams that are disclosed in embodiments of the application. The general purpose processor may be a microprocessor, or may be any conventional processor, or the like. Operations of the methods disclosed with reference to embodiments of the application may be directly performed and completed by a hardware decoding processor, or may be performed and completed by using a combination of hardware and a software module in the decoding processor. The software module may be located in a mature storage medium in the art, such as a random access memory (RAM), a flash memory, a read-only memory (ROM), a programmable read-only memory, an electrically erasable programmable memory, or a register. The storage medium is located in the memory 702, and the processor 701 reads the instruction in the memory 702, and completes the operations in the foregoing methods in combination with hardware of the processor 701.

Optionally, in some embodiments, the memory 702 may store an instruction used to perform the method performed by the base station in the method shown in FIG. 1. The processor 701 may complete, by executing the instruction stored in the memory 702 in combination with other hardware (for example, the transceiver 703), operations performed by the base station in the method shown in FIG. 1. For a working process and beneficial effects, refer to the descriptions in an embodiment shown in FIG. 1.

An embodiment of the application further provides a chip. The chip includes a transceiver unit and a processing unit. The transceiver unit may be an input/output circuit or a communications interface. The processing unit is a processor, a microprocessor, or an integrated circuit integrated into the chip. The chip may perform the method on the base station side in the foregoing embodiments.

In another embodiment, a computer-readable storage medium is provided. The computer-readable storage medium stores an instruction. When the instruction is executed, the method on the base station side in the foregoing method embodiments is performed.

In another embodiment, a computer program product including an instruction is provided. When the instruction is executed, the method on the base station side in the foregoing method embodiments is performed.

A person of ordinary skill in the art may be aware that, units and algorithm operations of the examples described in combination with embodiments disclosed in the specification may be implemented by electronic hardware or a combination of computer software and electronic hardware. Whether the functions are performed by hardware or software depends on a particular application and a design constraint of the technical solutions. One of ordinary skill in the art may use different methods to implement the described functions for each particular application, but it should not be considered that the implementation goes beyond the scope of the application.

One of ordinary skill in the art may clearly understand that, for convenient and brief description, for a detailed working process of the foregoing system, apparatus, and unit, refer to the corresponding processes in the foregoing method embodiments, and details are not described herein again.

In embodiments provided in the application, it should be understood that the disclosed system, apparatus, and method may be implemented in other manners. For example, the described apparatus embodiment is merely an example. For example, division into the units is merely logical function division, and may be other division during an actual implementation. For example, a plurality of units or components may be combined or integrated into another system, or some features may be ignored or may not be performed. In addition, the displayed or discussed mutual couplings or direct couplings or communication connections may be implemented through some interfaces. The indirect couplings or communication connections between the apparatuses or units may be implemented in an electrical form, a mechanical form, or another form.

The units described as separate parts may or may not be physically separated, and parts displayed as units may or may not be physical units, that is, may be located in one position, or may be distributed on a plurality of network units. Some or all of the units may be selected based on actual requirements to achieve the objectives of the solutions of embodiments.

In addition, functional units in embodiments of the application may be integrated into one processing unit, or each of the units may exist alone physically, or two or more units may be integrated into one unit.

All or some of the foregoing embodiments may be implemented through software, hardware, firmware, or any combination thereof. When a software program is used to implement embodiments, the embodiments may be implemented completely or partially in a form of a computer program product. The computer program product includes one or more computer instructions. When the computer program instructions are loaded and executed on a computer, the procedure or functions according to embodiments of the application are all or partially generated. The computer may be a general-purpose computer, a special-purpose computer, a computer network, a network device, user equipment, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a soft disk, a hard disk, or a magnetic tape), an optical medium (for example, a digital video disc (DVD)), a semiconductor medium (for example, a solid-state drive (SSD)), or the like.

The foregoing descriptions are merely specific implementations of the application, but the protection scope of the application is not limited herein. Any variation or replacement readily figured out by One of ordinary skill in the art within the technical scope disclosed in the application shall fall within the protection scope of the application. Therefore, the protection scope of the application shall be subject to the protection scope of the claims.

What is claimed is:

1. A communication method for an apparatus, comprising:
   determining a target cell based on measurement results of N cells and a preset value when a first cell satisfies a report trigger condition, wherein N is a positive integer greater than or equal to 1, wherein the preset value is a first preset value, and the determining the target cell comprises:
   determining at least one cell of the N cells as the target cell, wherein an absolute value of a difference between a cell quality of the at least one cell and a cell quality of a second cell is less than the first preset value, and the second cell is a cell having a best quality in the N cells; and
   sending a measurement result of the target cell to a network device.

2. The method according to claim 1, the method further comprising:
   receiving a measurement configuration from the network device, wherein the measurement configuration comprises the preset value.

3. The method according to claim 1, wherein the preset value is the first preset value or a second preset value, and the determining the target cell comprises:
   determining a quantity of good beams in each of the N cells, wherein the good beam is a beam having a beam quality that is greater than a good beam threshold;
   determining a maximum value of a quantity of good beams in the N cells; and
   determining at least one cell of the N cells as the target cell, wherein an absolute value of a difference between a quantity of good beams in the at least one cell and the maximum value of the quantity of good beams is less than the second preset value.

4. The method according to claim 1, wherein the preset value is the first preset value or a third preset value, and the determining the target cell comprises:
   determining an adjusted cell quality of each of the N cells based on a measurement event; and determining at least one cell of the N cells as the target cell, wherein an absolute value of a difference between the adjusted cell quality of the at least one cell and a trigger threshold is less than the third preset value.

5. The method according to claim 1, wherein the preset value is the first preset value or a target cell quality threshold, and the determining the target cell comprises:
   determining an adjusted cell quality of each of the N cells based on a measurement event; and
   determining at least one cell having the adjusted cell quality that is greater than the preset target cell quality threshold as the target cell.

6. The method according to claim 1, wherein the preset value includes the first preset value or a value $M_1$, and the determining the target cell comprises:
   determining $M_2$ of the N cells as target cells, wherein a cell quality of any one of the target cells is greater than or equal to a cell quality of any non-target cell, and the non-target cell is a cell not belonging to the target cells in the N cells, wherein $M_1$ is a positive integer greater than or equal to 1, $M_2$ is a positive integer greater than or equal to 1, and $M_2$ is less than or equal to both N and $M_1$.

7. An apparatus comprising:
   at least one circuitry that is configured to:
   determine a target cell based on measurement results of N cells and a preset value when a first cell satisfies a report trigger condition, wherein N is a positive integer greater than or equal to 1, wherein the preset value is a first preset value, and the at least one circuitry is further configured to determine at least one cell of the N cells as the target cell, wherein an absolute value of a difference between a cell quality of the at least one cell and a cell quality of a second cell is less than the first preset value, and the second cell is a cell having a best quality in the N cells; and
   send a measurement result of the target cell to a network device.

8. The apparatus according to claim 7, wherein the at least one circuitry is further configured to receive a measurement configuration from the network device, wherein the measurement configuration comprises the preset value.

9. The apparatus according to claim 7, wherein the preset value is the first preset value or a second preset value, the at least one circuitry is further configured to determine a quantity of good beams in each of the N cells, wherein the good beam is a beam having a beam quality that is greater than a good beam threshold;
   determine a maximum value of a quantity of good beams in the N cells; and
   determine at least one cell of the N cells as the target cell, wherein an absolute value of a difference between a quantity of good beams in the at least one cell and the maximum value of the quantity of good beams is less than the second preset value.

10. The apparatus according to claim 7, wherein the preset value is the first preset value or a third preset value, the at least one circuitry is further configured to determine an adjusted cell quality of each of the N cells based on a measurement event; and
    determine at least one cell of the N cells as the target cell, wherein an absolute value of a difference between the adjusted cell quality of the at least one cell and a trigger threshold is less than the third preset value.

11. The apparatus according to claim 7, wherein the preset value is the first preset value or a target cell quality threshold, the at least one circuitry is further configured to determine an adjusted cell quality of each of the N cells based on a measurement event; and
    determine at least one cell having the adjusted cell quality that is greater than the preset target cell quality threshold as the target cell.

12. The apparatus according to claim 7, wherein the preset value includes the first preset value or a value $M_1$, the at least one circuitry is further configured to determine $M_2$ of the N cells as target cells, wherein a cell quality of any one of the target cells is greater than or equal to a cell quality of any non-target cell, and the non-target cell is a cell not belonging to the target cells in the N cells, wherein $M_1$ is a positive integer greater than or equal to 1, $M_2$ is a positive integer greater than or equal to 1, and $M_2$ is less than or equal to both N and $M_1$.

13. A non-transitory computer-readable storage medium storing instructions that cause at least one processor to perform operations comprising:
    determining a target cell based on measurement results of N cells and a preset value when a first cell satisfies a report trigger condition, wherein N is a positive integer greater than or equal to 1, wherein the preset value is a first preset value, and wherein the non-transitory computer-readable storage medium further comprises instructions that cause the at least one processor to perform operations comprising:
    determining at least one cell of the N cells as the target cell, wherein an absolute value of a difference between a cell quality of the at least one cell and a cell quality of a second cell is less than the first preset value, and the second cell is a cell having a best quality in the N cells; and
    sending a measurement result of the target cell to a network device.

14. The non-transitory computer-readable storage medium according to claim 13, further comprising instructions that cause the at least one processor to perform operations comprising:
    receiving a measurement configuration from the network device, wherein the measurement configuration comprises the preset value.

15. The medium according to claim 13, wherein the preset value is the first preset value or a second preset value, and wherein the non-transitory computer-readable storage medium further comprises instructions that cause the at least one processor to perform operations comprising:

determining a quantity of good beams in each of the N cells, wherein the good beam is a beam having a beam quality that is greater than a good beam threshold;

determining a maximum value of a quantity of good beams in the N cells; and determining at least one cell of the N cells as the target cell, wherein an absolute value of a difference between a quantity of good beams in the at least one cell and the maximum value of the quantity of good beams is less than the second preset value.

16. The medium according to claim 13, wherein the preset value is the first preset value or a third preset value, and wherein the non-transitory computer-readable storage medium further comprises instructions that cause the at least one processor to perform operations comprising:

determining an adjusted cell quality of each of the N cells based on a measurement event; and determining at least one cell of the N cells as the target cell, wherein an absolute value of a difference between the adjusted cell quality of the at least one cell and a trigger threshold is less than the third preset value.

17. The medium according to claim 13, wherein the preset value is the first preset value or a target cell quality threshold, wherein the non-transitory computer-readable storage medium further comprises instructions that cause the at least one processor to perform operations comprising:

determining an adjusted cell quality of each of the N cells based on a measurement event; and determining at least one cell having the adjusted cell quality that is greater than the preset target cell quality threshold as the target cell.

\* \* \* \* \*